(12) United States Patent
Mansour

(10) Patent No.: US 10,909,387 B2
(45) Date of Patent: *Feb. 2, 2021

(54) METHOD AND SYSTEM FOR PREDICTING DYNAMICAL FLOWS FROM CONTROL INPUTS AND LIMITED OBSERVATIONS

(71) Applicant: Mitsubishi Electric Research Laboratories, Inc., Cambridge, MA (US)

(72) Inventor: Hassan Mansour, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/367,558

(22) Filed: Mar. 28, 2019

(65) Prior Publication Data

US 2020/0311439 A1 Oct. 1, 2020

(51) Int. Cl.
*G06T 9/00* (2006.01)
*G06K 9/00* (2006.01)
*G06T 7/246* (2017.01)
*G06T 7/215* (2017.01)

(52) U.S. Cl.
CPC ..... *G06K 9/00778* (2013.01); *G06K 9/00718* (2013.01); *G06T 7/215* (2017.01); *G06T 7/251* (2017.01); *G06T 2207/10016* (2013.01); *G06T 2207/20081* (2013.01); *G06T 2207/30196* (2013.01); *G06T 2207/30232* (2013.01)

(58) Field of Classification Search
CPC ............ G06K 9/00778; G06K 9/00718; G06T 7/215; G06T 7/251; G06T 2207/10016; G06T 2207/20081; G06T 2207/30196; G06T 2207/30232
See application file for complete search history.

(56) References Cited

U.S. PATENT DOCUMENTS

| | | | |
|---|---|---|---|
| 10,210,398 B2 * | 2/2019 | Mansour | G06K 9/00778 |
| 2010/0081929 A1 * | 4/2010 | Suzuki | A61B 8/08 |
| | | | 600/437 |
| 2011/0205359 A1 * | 8/2011 | Lee | G06T 7/285 |
| | | | 348/143 |
| 2014/0062881 A1 * | 3/2014 | Solomon | G06F 3/0346 |
| | | | 345/158 |
| 2017/0140546 A1 * | 5/2017 | Mansour | G06T 1/60 |
| 2018/0176531 A1 * | 6/2018 | Liu | G06T 5/005 |
| 2018/0197017 A1 * | 7/2018 | Mansour | G06K 9/6232 |
| 2018/0224293 A1 * | 8/2018 | Xu | G01C 21/3446 |

* cited by examiner

*Primary Examiner* — Khai M Nguyen
(74) *Attorney, Agent, or Firm* — Gennadiy Vinokur; James McAleenan; Hironori Tsukamoto

(57) ABSTRACT

Systems and methods for determining states of flow of objects in a scene. The methods and systems include measuring states of the flow at observed sample points of the scene, wherein the scene contains a set of sample points having subsets of observed and unobserved sample points. Store in a memory an operator specifying time-varying dynamics of training states of flow of the objects in the scene. Estimate, using the operator and the measured states at the subset of observed sample points, the states of the flow of the objects at the subset of unobserved sample points of the scene. Output the states of the flow at the set of unobserved sample points of the scene, so as to assist in a management of managing states of flow of objects in the scene.

15 Claims, 9 Drawing Sheets

METHOD AND SYSTEM FOR PREDICTING DYNAMICAL FLOWS FROM CONTROL INPUTS AND LIMITED OBSERVATIONS

FIELD

The present disclosure relates to methods and systems for crowd prediction, and more particularly to segmentation and identification using dynamical system analysis.

BACKGROUND

Dynamic flow completion from limited observation data is a common problem that arises in many fields such as crowd flow estimation, airflow sensing and weather and ocean current prediction.

For example, regarding crowd flow estimation, the segmentation of motion flows within dense crowds of pedestrians in videos is an essential tool in crowd safety and crowd control applications. Videos of crowded scenes can exhibit complex crowd behaviors even under normal situations. For example, crowd flows in large congested areas, such as train stations, can initially appear chaotic. However, is often the case that low dimensional dynamical structures exist in the flow that is desirable to identify and segment from unstructured flows. Moreover, the automatic segmentation of independent crowd flows aids in the monitoring and prediction of hazardous situations in crowded environments.

Of particular interest is the detection and estimation of crowd flows using motion information extracted from the videos. Motion vectors can be determined using optical flow estimation applied to texture, that is pixel intensities, in videos, or the motion vectors can be extracted directly from a bitstream. The bitstream can encoded using any of the well known coding standards, e.g., MPEG, H.264, HEVC, etc.

Considering pedestrians in a crowded scene as particles in a flow, the motion vectors of a video frame correspond to observations of the velocities of particles at a time instance in the flow. Processing motion vectors, instead of the video texture, protects the privacy of individuals observed in surveillance videos.

U.S. Pat. No. 8,773,536 discloses a method for detecting independent motion in a surveillance video. The method constructs a linear system from macroblocks of the video by comparing texture gradients with motion vector. Independent flows are detected when the motion is flagged as a statistical outlier relative to the linear system.

However, the above methods do not model the influence of control inputs to the dynamical system that affect the changes in the particle flows.

Accordingly, there is need to develop systems and methods that model the influence of control inputs to the dynamical system that affect the changes in the particle flows.

SUMMARY

The present disclosure relates to methods and systems for crowd prediction, and more particularly to segmentation and identification using dynamical system analysis.

The embodiments of the present disclosure provide for a system and method in the field of dynamical flow prediction using dynamical system analysis with control inputs. For example, the present disclosure provides for predicting and completing the flows of crowds in a large scene from control input data such as initial and boundary conditions as well as from limited spatial observations in regions of the scene. For a particular scene, the systems and methods first obtain training velocity data of example crowds flowing through a desired scene and training control inputs that affect the flows in the scene. The training data and control input data might be obtained through surveillance video observations of a complete scene or through computer simulations of flows within the scene.

Further, the training data and control input data could then be used to learn a system dynamics operator and an input-mapping operator, which relate the observed regions and control inputs to the evolution of state variables that control the flow in the scene. At least one example of a system dynamics operator can be a kernel dynamic mode decomposition (KDMD) operator that captures the dynamics experienced in the scene. For every new flow observed in a spatially limited region, the flow completion problem is cast as a least squares inverse problem constrained by the prediction of the KDMD operator, the observed state variables, and the control input data. A basis representation for the flow in the scene and another basis representation for the control input data can be determined from the KDMD operator. At least one aspect is that flow completion can be achieved by estimating the coefficients of the basis expansion from the control input data and the observed flow. The coefficients can finally be used to reconstruct the complete flow by a projection onto the KDMD bases.

In other words, learned from experimentation, is that it is possible to overcome the problem of estimating temporally evolving flow parameters on a spatial grid or scene that is not fully observed. For example, the present disclosure provides for reconstructing the complete flow of the scene, either using only the control input data or combining the input data with limited observations by a limited number of sensors that do not cover the entire scene or entire grid. In fact, the present disclosure can provide accurate representations of the flow of a real crowd of pedestrians inexpensively, efficiently and quickly, since the training stage allows for calculations to be carried out at other times or offline, rather during use or real time.

The present disclosure provides a data-driven framework for flow completion where training data defined over the complete scene $\Omega$ are available to learn a kernel DMD operator that captures the dynamics of flows in the scene. pThen, for new test flows defined over a subset $\Gamma \subset \Omega$, we solve a least squares minimization problem constrained by the one step prediction of kernel DMD operator.

For example, the present disclosure overcomes some of the problems of conventional crowd flow methods that failed to figure out crowd flow completion. The present disclosure includes aspects of the macroscopic scale, namely variations on a model that characterizes the flow in terms of the flow density and velocity. Wherein, when trying to find a solution to completing a partially observed flow, such a problem requires solving an inverse problem that identifies an initial and boundary conditions of the partial differential equation (PDE) that governs the flow, as well as the flow parameters, among other aspects.

According to an embodiment of the present disclosure, a system for determining states of flow of objects in a scene. The system including at least one sensor to measure the states of the flow at observed sample points of the scene. Wherein the scene contains a set of sample points having subsets of observed and unobserved sample points, and a set of control inputs. A memory to store an operator specifying time-varying dynamics of training states of flow of the objects in the scene. Wherein the operator is pretrained to determine an estimated future state of the states of flow of the objects at a sample point in the scene, as a function of current measured states of the states of flow of the objects at the set of sample points in the scene and the set of control inputs that define initial and boundary states of the flow. A processor in communication with the memory, configured to estimate, using the operator and the measured states at the subset of observed sample points, the states of the flow of the objects at the subset of unobserved sample points of the scene. Such that the estimated future states at the subset of observed sample points are consistent with the measured states at the subset of observed sample points. An output interface in communication with the processor, configured for outputting the states of the flow at the set of unobserved sample points of the scene, so as to assist in a management of managing states of flow of objects in the scene. The method and systems of the present disclosure can be used in video surveillance systems, monitoring electrical power grid systems, fluid and air flow simulation and modeling where the new method allows for specifying initial and boundary conditions in the modeling.

According to another embodiment of the present disclosure, a method for determining states of flow of objects in a scene. The method including measuring states of flow at observed sample points of the scene. Wherein the scene contains a set of sample points having subsets of observed and unobserved sample points and a set of control inputs. Storing in a memory an operator specifying time-varying dynamics of training states of flow of the objects in the scene. Wherein the operator is pretrained to determine an estimated future state of the states of flow of the objects at a sample point in the scene, as a function of current measured states of the states of flow of the objects at the set of sample points in the scene and the set of control inputs. Using a processor in communication with the memory, the processor is configured to estimate, using the operator and the measured states at the subset of observed sample points, the states of the flow of the objects at the subset of unobserved sample points of the scene. Such that the estimated future states at the subset of observed sample points are consistent with the measured states at the subset of observed sample points. Outputting the states of the flow at the set of unobserved sample points of the scene, so as to assist in a management of managing states of flow of objects in the scene, via an output interface in communication with the processor.

Another embodiment of the present disclosure, a non-transitory computer readable storage medium embodied thereon a program executable by a processor for performing a method, the method for determining states of flow of objects in a scene. The non-transitory computer readable storage medium including measuring states of flow at observed sample points of the scene, wherein the scene contains a set of sample points having subsets of observed and unobserved sample points and a set of control inputs. Storing in a memory an operator specifying time-varying dynamics of training states of flow of the objects in the scene. Wherein the operator is pretrained to determine an estimated future state of the states of flow of the objects at a sample point in the scene, as a function of current measured states of the states of flow of the objects at the set of sample points in the scene and the set of control inputs. Using a processor in communication with the memory, the processor is configured to estimate, using the operator and the measured states at the subset of observed sample points, the states of the flow of the objects at the subset of unobserved sample points of the scene. Such that the estimated future states at the subset of observed sample points are consistent with the measured states at the subset of observed sample points. Outputting the states of the flow at the set of unobserved sample points of the scene, so as to assist in a management of managing states of flow of objects in the scene, via an output interface in communication with the processor.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art, which fall within the scope and spirit of the principles of the presently disclosed embodiments.

DETAILED DESCRIPTION

The present disclosure relates to methods and systems for crowd prediction, and more particularly to segmentation and identification using dynamical system analysis. For example, some embodiments of the present disclosure include a data-driven framework for flow completion where training data defined over a complete scene $\Omega$ are available to learn a kernel DIMD operator that captures the dynamics of flows in a scene. Then, for new test flows have been developed to be defined over a subset $\gamma \subset \Omega$, in order to solve a least squares minimization problem constrained by a one step prediction of kernel DMD operator, among other aspects.

Figure 1A:
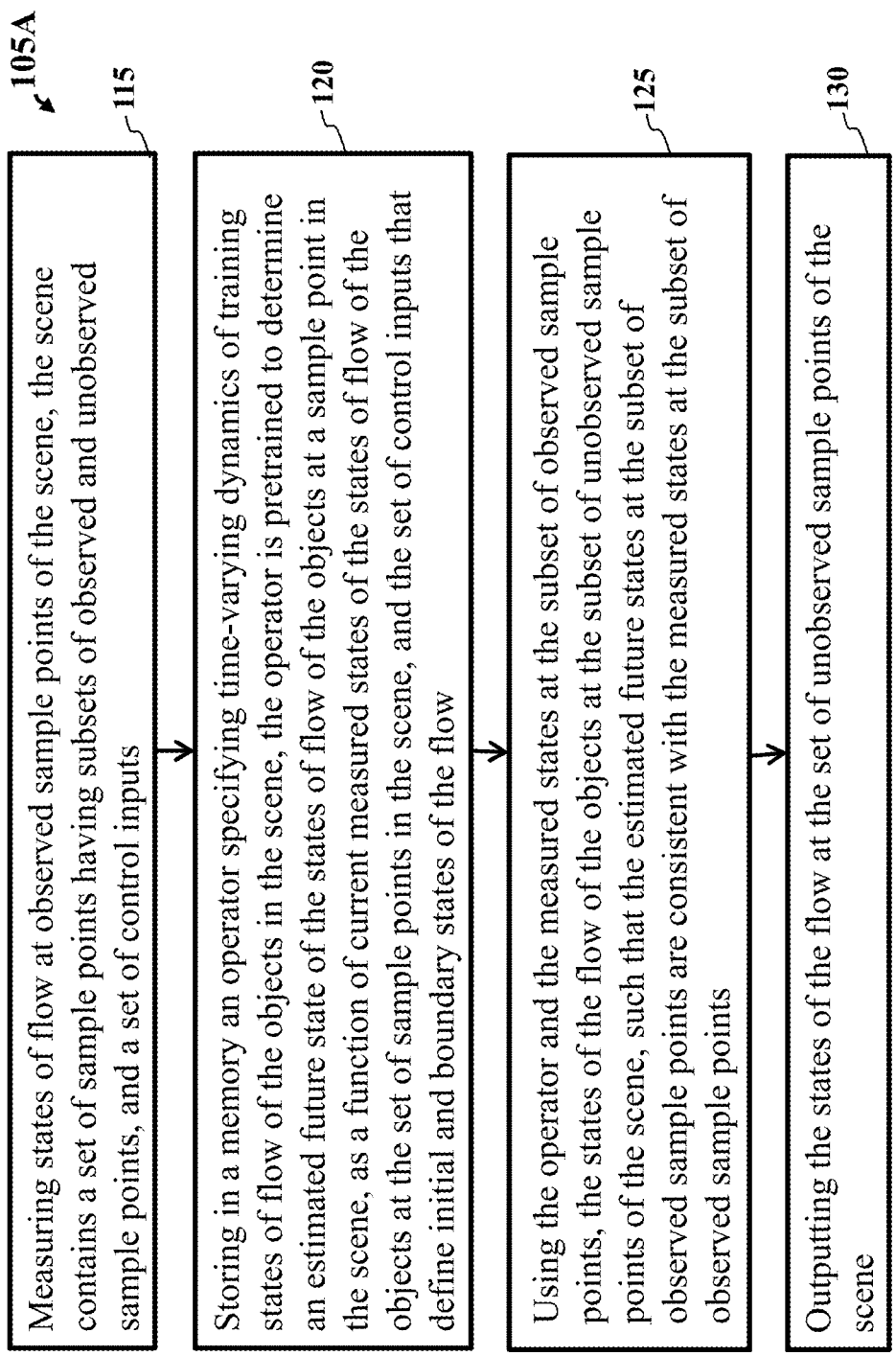
FIG. 1A is a flow diagram illustrating some method steps for implementing a method for determining states of flow of objects in a scene, according to embodiments of the present disclosure.

FIG. 1A is a flow diagram illustrating some method steps for implementing a method for determining states of flow of objects in a scene, according to embodiments of the present disclosure.

Step 115 of FIG. 1A includes measuring states of flow at observed sample points of the scene, wherein the scene contains a set of sample points having subsets of observed and unobserved sample points.

Step 120 of FIG. 1A includes storing in a memory an operator specifying time-varying dynamics of training states of flow of the objects in the scene, wherein the operator is pretrained to determine an estimated future state of the states of flow of the objects at a sample point in the scene, as a function of current measured states of the states of flow of the objects at the set of sample points in the scene.

Step 125 of FIG. 1A includes using a processor in communication with the memory, the processor is configured to estimate, using the operator and the measured states at the subset of observed sample points, the states of the flow of the objects at the subset of unobserved sample points of the scene, such that the estimated future states at the subset of observed sample points are consistent with the measured states at the subset of observed sample points.

Step 130 of FIG. 1A includes outputting the states of the flow at the set of unobserved sample points of the scene, so as to assist in a management of managing states of flow of objects in the scene, via an output interface in communication with the processor.

Embodiments of the present disclosure provide unique aspects, by non-limiting example, is making it possible to overcome the problem of estimating temporally evolving flow parameters on a spatial grid or scene that is not fully observed. Some aspects provide for provides for reconstructing the complete flow of the scene, either using only the control input data or combining the input data with limited observations by a limited number of sensors that do not cover the entire scene or entire grid.

Other advantages of some of the methods and systems of the present disclosure can provide accurate representations of the flow of a real crowd of pedestrians inexpensively, efficiently and quickly, since the training stage allows for calculations to be carried out at other times or offline. Further, other aspects of the present disclosure is that of the macroscopic scale, namely variations on a model that characterizes the flow in terms of the flow density and velocity. For example, when trying to find a solution to completing a partially observed flow as in the present disclosure, such a problem requires solving an inverse problem that identifies an initial and boundary conditions of the partial differential equation (PDE) that governs the flow, as well as the flow parameters, among other aspects.

Figure 1B:
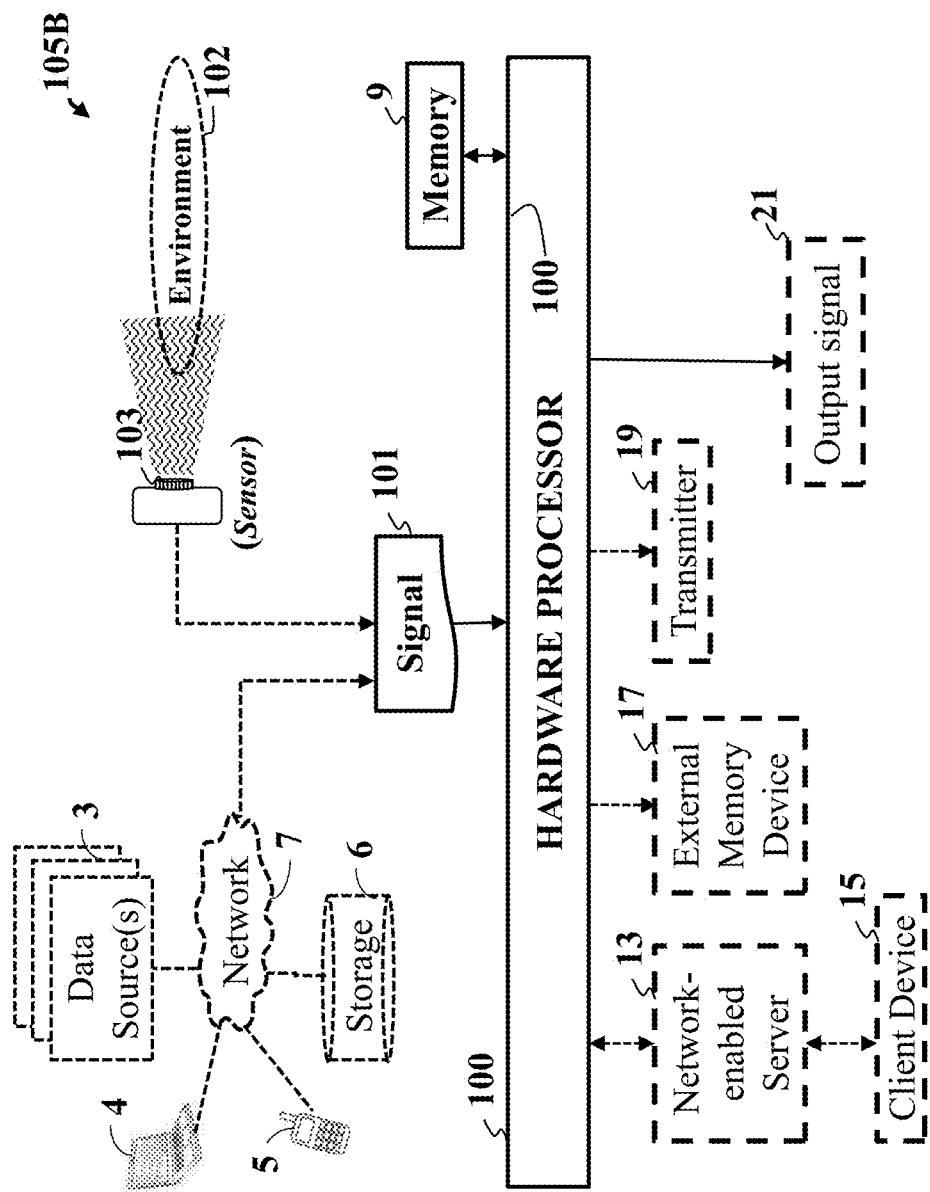
FIG. 1B is a block diagram illustrating some components that can be used for implementing the systems and methods, according to embodiments of the present disclosure.

FIG. 1B is a block diagram illustrating some components that can be used for implementing the systems and methods, according to embodiments of the present disclosure. For example, method 105B can include the hardware processor 100 in communication with a sensor 103 or sensors, such as an acoustic sensor, that collects data including an acoustic signal(s) 8 from an environment 102. The signal can include data related to a video or videos. Further, the sensor 2 can convert a video or camera input into the signal data. The hardware processor 100 is in communication with a computer storage memory, i.e. memory 9, such that the memory 9 includes stored data, including algorithms, instructions and other data, that can be implemented by the hardware processor 100.

Optionally, the hardware processor 100 can be connected to a network 7, that is in communication with a data source(s) 3, computer device 4, a mobile phone device 5 and a storage device 6. Also optionally, the hardware processor 100 can be connected to a network-enabled server 13 connected to a client device 15. The hardware processor 100 can optionally be connected to an external memory device 17, a transmitter 19. Further, the output 21 can be, by non-limiting example, complete flow parameters (209 of FIG. 2) or some other output related to the systems and methods of the present disclosure. For example, some types of output can be related to a user's intended interested in displaying the complete flow parameters (209 of FIG. 2) on one or more display device, such as a monitor or screen, or inputting the complete flow parameters (209 of FIG. 2) into an other computer related device for further analysis, etc.

It is contemplated the hardware processor 100 can include two or more hardware processors depending upon the requirements of the specific application, wherein the processors can be either internal or external. Certainly, other components may be incorporated with method 105B including output interfaces and transceivers, among other devices (see FIG. 7).

It is possible the network 7 can include, by non-limiting example, one or more local area networks (LANs) and/or wide area networks (WANs). Wherein the networking environments can be similar to enterprise-wide computer networks, intranets and the Internet. Contemplated for all the components mentioned that there could be any number of client devices, storage components, and data sources employed within the system 105B. Each may comprise a single device or multiple devices cooperating in a distributed environment. Further, system 105B can include one or more data source(s) 3. Data source(s) 3 may comprise data resources for training a network. For example, in an embodiment, training data can be stored in the storage 6. The training data can also include signals of other environments. Data source(s) 3 may also comprise data resources for training a network. The data provided by data source(s) 3 may include other data, such as other video or camera data.

Further, some data in data source(s) 3 can be provided by one or more feedback loops. Other examples of data sources may include by way of example, and not limitation, various image sources including streaming video, web queries, mobile device camera or other information, web cam feeds, smart-glasses and smart-watch feeds, customer care systems, security camera feeds, web documents, catalogs, user feeds, SMS logs, instant messaging logs, spoken-word transcripts, gaming system user interactions such as voice commands or captured images (e.g., depth camera images), tweets, chat or video-call records, or social-networking media. Specific data source(s) 3 used may be determined based on the application including whether the data is a certain class of data (e.g., data only related to specific types of sounds, including machine systems, entertainment systems, for example) or general (non-class-specific) in nature.

System 105B can include third party devices 4, 5, which can comprise of any type of computing device, such that there may be interest to have an automatic speech recognition (ASR) system on the computing device. For example, the third party devices including a computer device 4 or a mobile device 5. Contemplated is that a user device may be embodied as a personal data assistant (PDA), a mobile device, such as a smartphone, smart watch, smart glasses (or other wearable smart device), augmented reality headset, virtual reality headset. Further, the user device could be a laptop, such as a tablet, remote control, entertainment system, vehicle computer system, embedded system controller, appliance, home computer system, security system, consumer electronic device, or other similar electronics device. In one embodiment, the client device is capable of receiving input data such as audio and image information usable by an ASR system described herein that is operating on the device. For example, the third party device may have a microphone or line-in for receiving audio information, a camera for receiving video or image information, or a communication component (e.g., Wi-Fi functionality) for receiving such information from another source, such as the Internet or a data source 3.

Regarding the storage 6, the storage 6 can store information including data, computer instructions (e.g., software program instructions, routines, or services), and/or models used in embodiments of the technology described herein. For example, the storage 6 can store data from one or more data source(s) 3, one or more deep neural network models, information for generating and training deep neural network models, and the computer-usable information outputted by one or more deep neural network models.

Figure 1C:
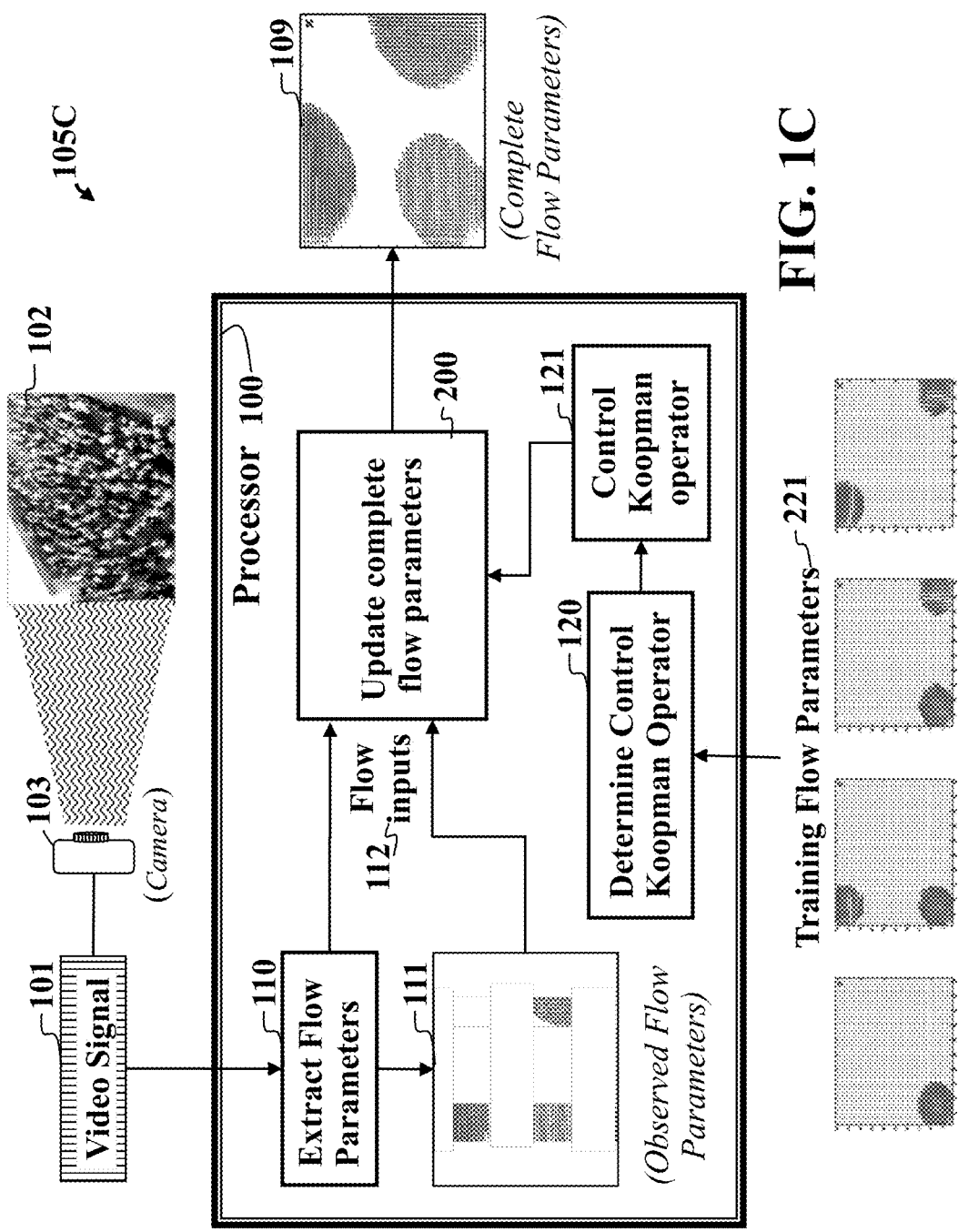
FIG. 1C is a schematic of illustrating a system and method for estimating complete object flows in a video acquired of a scene showing a Koopman operator and control inputs according to embodiments of the present disclosure.

FIG. 1C is a schematic of illustrating a system and method for estimating complete object flows in a video acquired of a scene showing a Koopman operator and control inputs, according to embodiments of the present disclosure. For example, some embodiments provide for a data-driven framework for flow completion where training data defined over the complete scene f are available to learn a kernel DMD operator that captures the dynamics of flows in the scene. Then, for new test flows defined over a subset r c f, solve a least squares minimization problem constrained by the one step prediction of kernel DMD operator.

Figure 2:
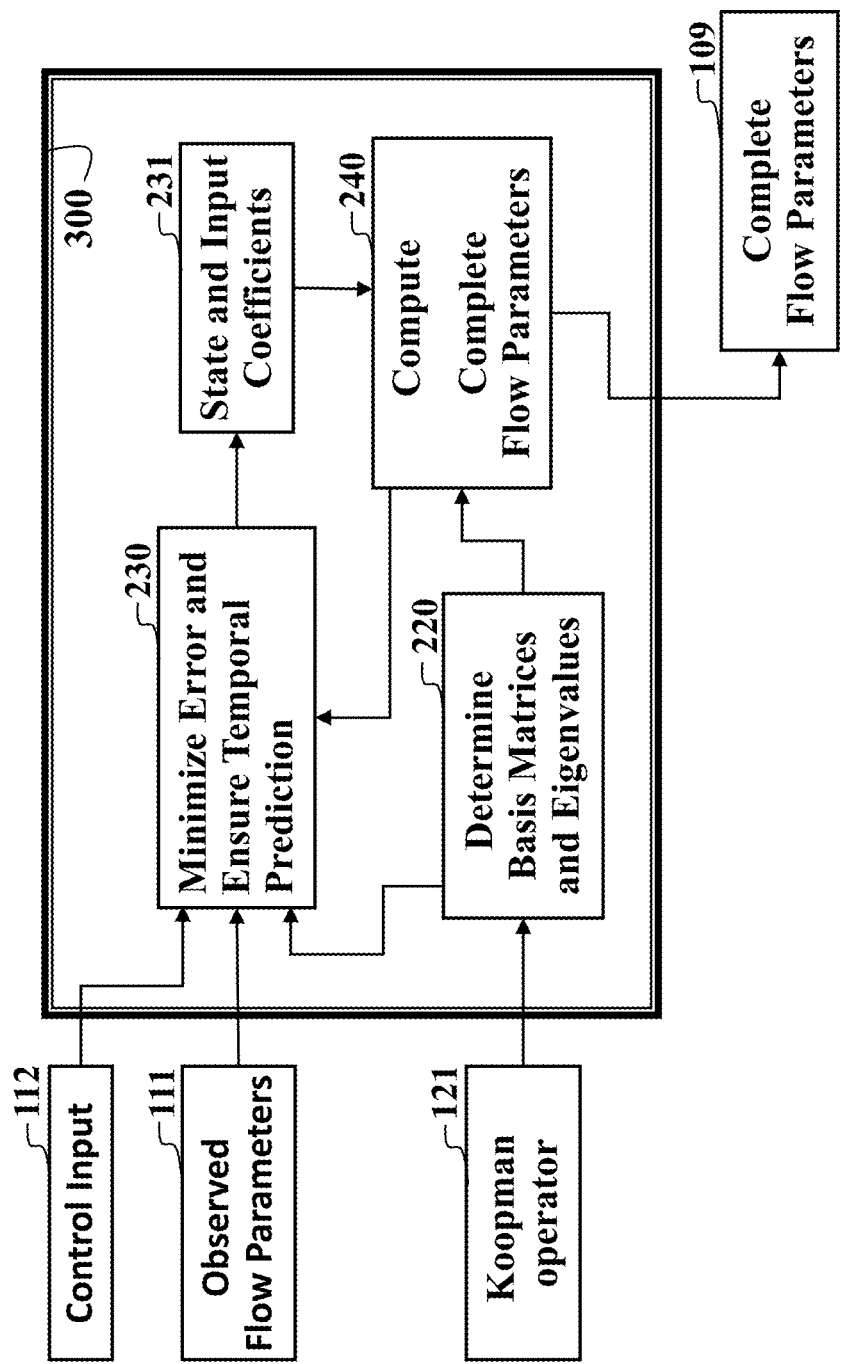
FIG. 2 is a flow diagram of a method for determining complete flow parameters by observing control inputs, determining Koopman modes and eigenvalues, then estimating basis coefficients of the Koopman modes and control inputs, wherein the complete flow parameters can be determined by combining the estimated basis coefficients with the Koopman modes, according to some embodiments of the present disclosure.

FIG. 2 is a flow diagram of a method for determining complete flow parameters by observing control inputs, determining Koopman modes and eigenvalues, then estimating basis coefficients of the Koopman modes and control inputs, wherein the complete flow parameters can be determined by combining the estimated basis coefficients with the Koopman modes, according to some embodiments of the present disclosure.

Figure 3:
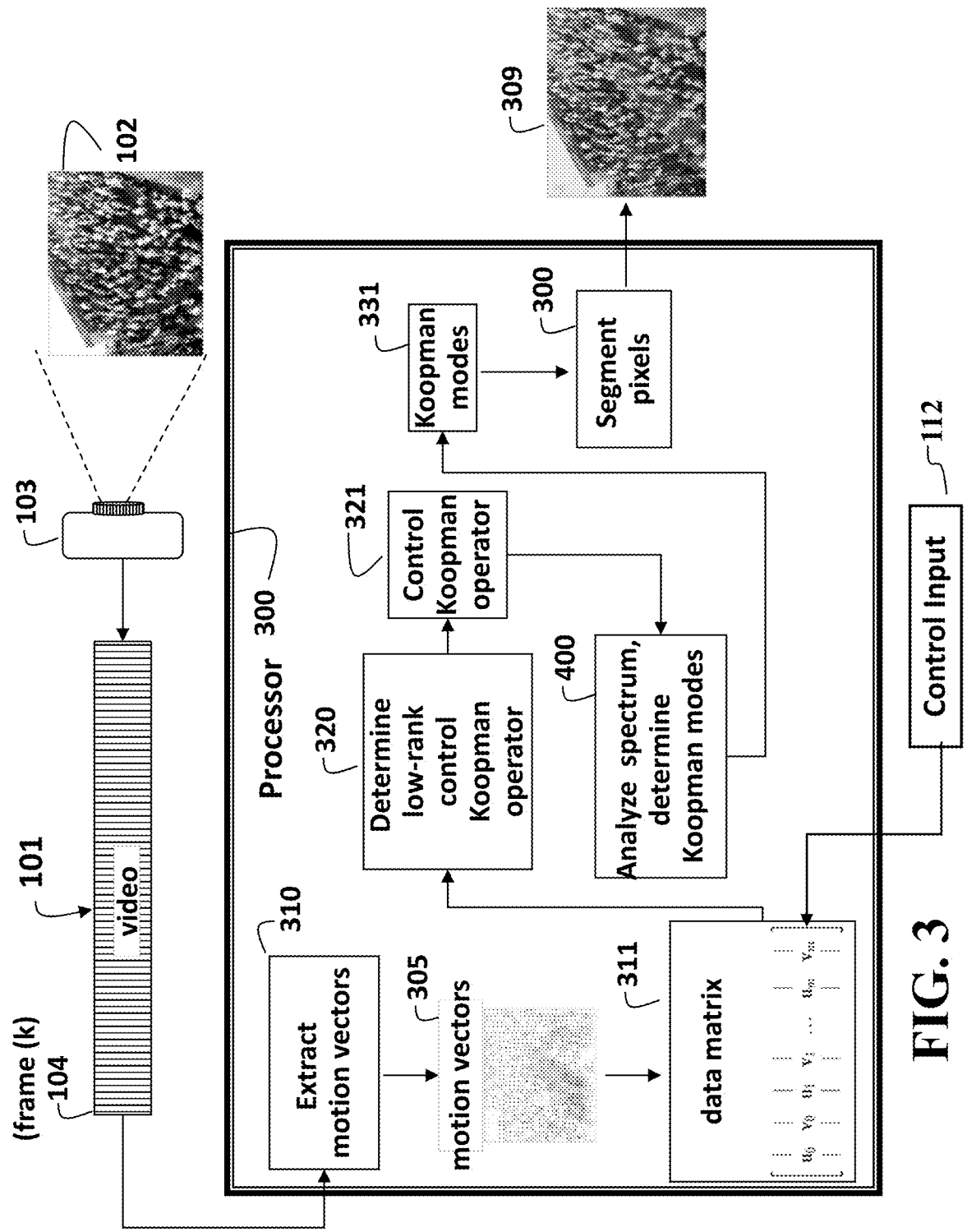
FIG. 3 is a schematic diagram illustrating some system and method steps for segmenting pedestrians flows in a video acquired of a scene, according to an embodiment of the present disclosure.

FIG. 3 is a schematic diagram illustrating some system and method steps for segmenting pedestrians flows in a video acquired of a scene, according to an embodiment of the present disclosure. The embodiments can use motion vectors extracted from an encoded bitstream, although the motion vectors can be obtained by other means. The motion vectors are treated as observables of an underlying dynamical system composed of several independent dynamics that charcterize the flows in the scene. The method determines a low rank Koopman operator that characterizes the dynamical system using the motion vectors and the control inputs. The spectrum of the control Koopman operator is then analyzed using singular value decomposition (SVD) or eigenvalue decomposition. The independent crowd flows are determined by clustering the dominant singular vectors or the dominant eigenvectors, depending on the decomposition that is used.

For example, FIG. 3 a video 101 is acquired of pedestrians in a scene 102 with a video camera 103. The video includes a set of frames. Each frame includes a set of blocks that typically encode motion vectors. Each frame k 104 is processed by the method operating in a processor 300 connected to memory and the camera by input/output buses as known in the art. The video is in a form of an encoded bitstream.

As an advantage, an encoded bitstream is usually compressed by at least two orders of magnitude or more. Hence, the bitstream takes much less storage and time to process. In addition, the method can operate at the block level so that the bitstream does not need to be decode to obtain pixels. However, the method can operate in a camera and obtain the motion vectors by other means.

The method extracts 310 motion vectors 305 from the video, e.g., blocks in the bitstream, and constructs a data matrix 111 by stacking the motion vectors as described below in greater detail. The control inputs are also appended to the data matrix 111 along with the motion vectors.

A low-rank control Koopman operator 321 is determined 320 from the data matrix 311. The spectrum of a low-rank control Koopman operator is analyzed to determine dominant Koopman modes 331. The Koopman modes can than be used to segment 300 blocks in frames of the video to obtain independent flows 309.

Figure 4:
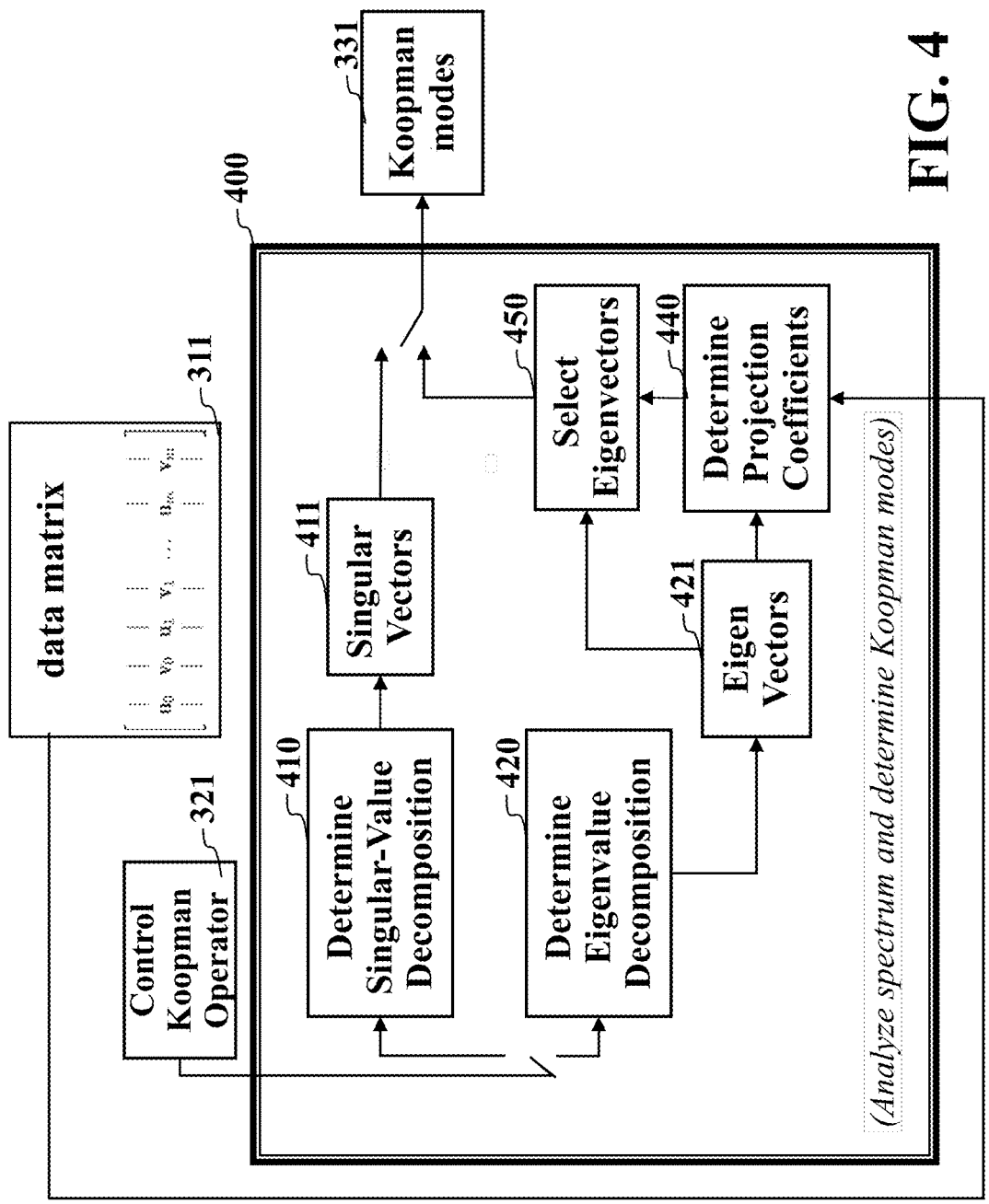
FIG. 4 is a flow diagram illustrating some method steps for determining Koopman modes, according to some embodiments of the present disclosure.

FIG. 4 shows the steps 400 used to analyze the spectrum and determine the Koopman modes 131. The steps include the SVD 410 to obtain singular vectors 411 or an eigenvalue decompsition to determine eigenvectors, or both. Step 440 determines projection coefficients, which are then use to select 450 eigenvectors. The singular vectors or selected eigenvectors, or both, can then be used to determine the Koopman modes 431.

Figure 5:
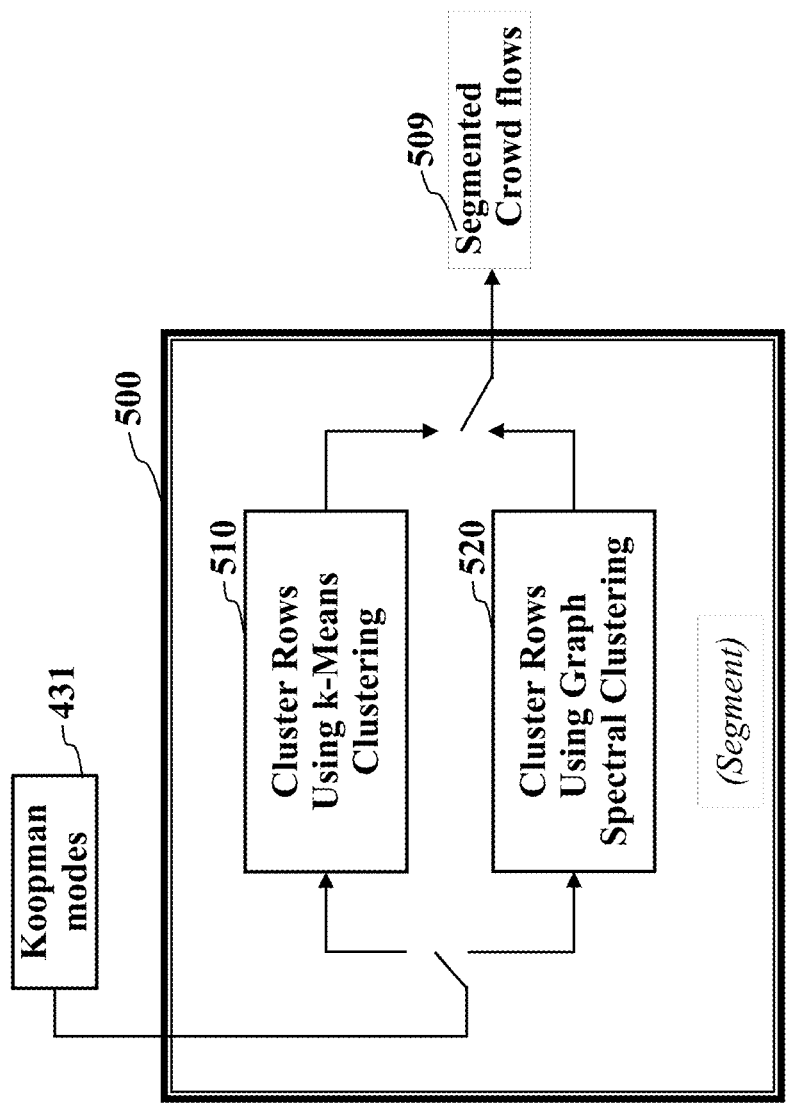
FIG. 5 is a flow diagram illustrating some of a method for segmenting independent flows using the Koopman modes, according to some embodiment of the present disclosure.

FIG. 5 shows the steps 500 of segmenting the pixels, which takes as input the Koopman modes 431. Motion vectors are clustered using k-means clustering 510 or graph spectral clustering 520 to obtain the independent flows 509.

Figure 6:
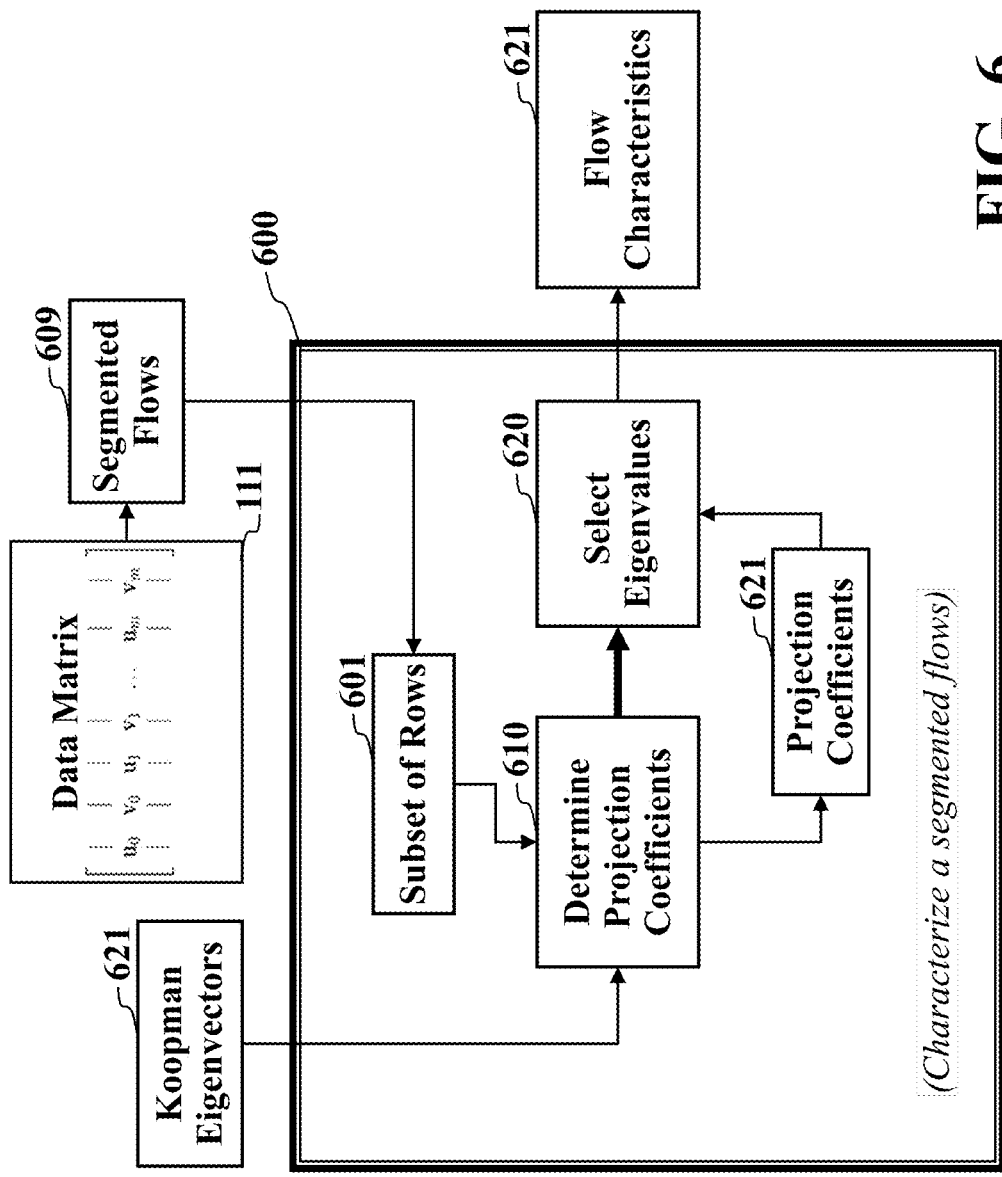
FIG. 6 is a flow diagram illustrating some of a method for characterizing independent segmented pedestrian flows, according to some embodiment of the present disclosure.

FIG. 6 shows the steps 600 of characterizing each segmented flow by determining a dynamical regime of the flow. The dynamical regimes essentially characterizes the flows. The steps take as input the Koopman eigenvectors 621, the data matrix 111 and the segmented flows 509. A subset of rows 601 of the data matrix 111 are extracted using the segmented flows 509. The subset of rows 601 are projected 610 onto the Koopman eigenvectors 621 to determine projection coefficients 621. An eigenvalue selection step 620 chooses the eigenvalues that correspond to the eigenvectors that have projection coefficients with magnitudes larger than a threshold. The dynamical regime of the flow or flow characteristics 421 is identified by the selected eigenvalues.

We now describe the details of the above steps.

Training Data Generation

The dynamics of a crowd can be modeled at the micro and macro scales as the motion of particles in a fluid flow. Alternatively, when real video surveillance data that cover all of f are available, flow information can be extracted by computing video motion vectors.

When considering the macroscopic scale, namely variations on a model that characterizes the flow in terms of the flow density and velocity. A finite volume method is used to numerically solve the corresponding partial differential equation (PDE). The model is run with L different initial conditions for T+1 time steps and collect the data as follows. Every training sequence indexed by l, $1 \leq l \leq L$, that defines an input control matrix $U^l_{tr}$ that specifies the initial and boundary conditions, as well as input and output flows of the training sequence. For the l-th initial condition, $1 \leq l \leq L$, a data matrix $Z^l \in \mathbb{R}^{D \times (T+1)}$ is formed by vertically stacking the horizontal and vertical velocities for each spatial grid point in $\Omega$, where the scene grid is of size $N_x \times N_y$ and $D = 2N_x N_y$. Let $Z^l = [z_1^l, \ldots, z_{T+1}^l]$, we rearrange the columns of $Z^l$ to construct current and future training data matrices $X_{tr}^l$ and $Y_{tr}^l$, such that $X_{tr}^l=[z_1^l, \ldots z_T^l]$, $Y_{tr}^l=[z_2^l, \ldots z_{T+1}^l]$. The data matrices associated with each of the L initial conditions are then stacked to form the total training data matrices $X_{tr}=[X1_{tr}, \ldots, X^{Ntr}]$ and $Y_{tr}=[Y_{tr}, \ldots, Y^{Nt}r]$. Similarly, the input control matrices are stacked to from the training input matrix $U_{tr}=[U_{tr}^1, \ldots, U_{tr}^N]$.

Dynamical System Modeling

Linear Model

When the system dynamics are linear, the evolution of the state variables of the dynamical system is given by $$x_{t+1} = Kx_t + \hat{B}u_t, \quad (8)$$

where $x_t$ and $u_t$ are the state variable and control input at time t, respectively. Given the training data matrices $Y_{tr}$, $X_{tr}$, and $U_{tr}$, where the vectors $x_{t+1}$ are stacked in the matrix $Y_{tr}$, we can compute the matrices K and B using least squares inversion as follows $$\{K, \hat{B}\} = \arg\min_{K,\hat{B}} \frac{1}{2} \|Y_{tr} - KX_{tr} - \hat{B}U_{tr}\|_F^2 \quad (9)$$

Next, consider the truncated eigenvalue decomposition of $K = V\Lambda V^{-1}$ and the truncated singular value decomposition of $U = P\Delta R^T$, where we keep only the largest r eigenvalues $\lambda$ and corresponding eigenvectors V, and similarly the largest r singular values $\delta$ and corresponding left and right singular vectors P and R. We can then define a set of state space coefficients $C = V^{-1}X$ and a set of control input coefficients $H = \Delta R^T$. Denoting by $\Xi := V$, $D = P$, and by $B = V^\dagger \hat{B}P$, we obtain the following system state equations:

$$\begin{cases} x_t = \Xi c_t, \\ u_t = Dh_t, \\ c_{t+1} = \Lambda c_t + Bh_t, \end{cases}$$

where $C = [c_1, \ldots c_T]$ and $H = [h_1, \ldots h_T]$.

Nonlinear model

The kernel DMD operator is learned by computing the matrices $\Xi$, and $\Lambda$ as described in Section while accounting for the following changes.

Define the kernel input data matrix $\hat{H}_{ij}$ by evaluating the kernel inner products of the control inputs as follows $$\hat{H}_{ij} = f(u_i, u_j) \quad (10)$$

where $u_i$ and $u_j$ are column vectors of the data set U. A rank-r truncated singular value decomposition of the symmetric matrix $\hat{H}$ results in the singular vector matrix P and the singular value matrix $\Delta^2$. Next we impose a linear dynamical system model on the reduced space of the kernel matrices $\hat{A}_{ij}$, $G_{ij}$, and $H_{ij}$, i.e., $$E^\dagger Q^T \hat{A} = \hat{K}(\Sigma Q^T) + \hat{B}(\Delta^\dagger P^T \hat{H}). \quad (11)$$

Next we define the state space coefficient matrix $C = \hat{V}^\dagger \Sigma Q^T = [c_1, \ldots c_T]$ and the control input coefficient matrix $H = \Delta P^T = [h_1, \ldots h_T]$.

Finally, we model the state variables $x_t$ and inputs $u_t$ as follows $$\begin{cases} x_t = \Xi c_t, \\ u_t = Dh_t, \\ c_{t+1} = \Lambda c_t + Bh_t, \end{cases}$$

where $\Xi$ is a subspace basis for the state space variables, D is a subspace basis for the control input variables, and B:=

$\Xi^\dagger D$ is a transformation matrix from the subspace of the control inputs to the subspace of the state variables. Given the coefficient matrices C and H from the training data, we can estimate the subspace matrices as $\Xi = X_{tr} C^\dagger$ and $D = U_{tr} H^\dagger$.

Flow Completion

Suppose that we observe the velocities of a new flow $X^* = \{x_1^*, \ldots, x_{T'}^*\} \in \mathbb{R}^D$ on the region $\gamma \subset \Omega$ that shares the dynamics of the training set. Denote by $O = \{o_1, \ldots o_{T'}\}$, $O \subset \mathbb{R}^d$, $d < D$ the sequence of observed velocities over T snapshots in time. Similarly, denote by $U = \{u_1, \ldots u_{T'}\}$ the sequence of observed control inputs of the T snapshots. Also let $M: \mathbb{R}^D \to \mathbb{R}^d$ be a masking operator that maps from $\Omega$ to $\Gamma$. We represent the masking operator by the d×D matrix with the same name M. Then $\forall 1 \le t \le T'$, $o_t = Mx_t^*$. Our goal is to estimate $x_t^*$ from the partial observations $o_t$ and using the approximated Koopman modes, eigenvalues, and eigenfunctions as shown in (7). Hence, the flow completion problem becomes that of estimating the coefficient matrix $C = [c_1 \ldots c_{T'}] \in \mathbb{R}^{K \times T'}$ from the observations O and inputs U. Therefore, we propose the following optimization problem to recover the matrix C:

$$\min_{C, \hat{b}H} \frac{1}{2}\|O - M\Xi C\|_F^2 + \frac{1}{2}\|U - DH\|_F^2 + \frac{\gamma}{2}\|\Lambda CE_1 + BHE_1 - CE_2\|_F^2 \quad (12)$$

where $E_1$ and $E_2$ are restriction operators that select columns 1 to T'−1 and 2 to T' of C, respectively, and $\gamma$ is a regularization parameter. The regularization term $$\frac{\gamma}{2}\|\Lambda CE_1 + BHE_1 - CE_2\|_F^2$$

ensures that the coefficients $c_t$ behave as the kernel synthesis coefficients by satisfying the one step prediction relation $c_{t+1} \approx \Lambda c_t + Bh_t$. Finally, the completed flow $\tilde{x}_t$ can be recovered by multiplying the computed $\tilde{C}$ with the Koopman mode matrix $\tilde{\Xi}$ i.e. $\tilde{x}_t = \tilde{\Xi} \tilde{c}_t$ for all Motion Vectors and Observable data matrix The horizontal and vertical motion vectors of all spatial blocks in a video frame k 104 are $u_k$ and $v_k$, respectively. The control inputs are $c_k$. We construct the data matrix $z_k = [u_k, v_k, c_k]$ 111 by stacking the horizontal and vertical motion vectors as well as the control inputs in the data marix 111. Then, the temporal evolution of the motion vectors can be modeled, using the control Koopman operator K, by fitting the data to a one step prediction model $$z_k = Kz_{k-1}. \quad (1)$$

Notice that (1) ensures that the same operator K models the temporal evolution of the motions vectors $u_k$ and $v_k$.

If we have m+1 observations of motion vectors from m+1 video frames, then we can determine the operator K using a dynamic mode decomposition (DMD) by forming the data matrices $Z_1$ and $Z_2$ similar to 6 and determining the operator $K_{ls}$ that achieves the least squares fit, i.e., $$K_{ls} = \arg\min_K \frac{1}{2}\|Z_2 - KZ_1\|_F^2, \quad (2)$$

$$= Z_2 Z_1^\dagger,$$

where the superscript $\dagger$ indicates the Moore-Penrose pseudo-inverse of a matrix.

If the motion vectors correspond to the true motion of pedestrians in the video, then the operator $K_{ls}$ characterizes the full dynamics of the flow in the system. However, compressed domain motion vectors are generally very noisy and often contain motion vectors that do not correspond to the true motion. The noise depends on the specific rate-distortion optimization by the video encoder.

Low-Rank DMD

A noise-free velocity observations $y_k$ measure true motion of pedestrians in the scene. and the motion vectors $z_k$ correspond to noisy observations, such that $$z_k + e_k = y_k, \quad (3)$$

where $e_k$ is additive noise. Let $E_1$, $E2$ and $Y_1$, $Y_2$ be as in 6 for $e_k$ and $Y_k$, respectively. Then, the control Koopman operator corresponding to the noise-free dynamics is given by a total least squares constraint $$\begin{aligned} Y_2 &= KY_1 \\ \Leftrightarrow Z_2 + E_2 &= K(Z_1 + E_1) \end{aligned}. \quad (4)$$

However, the problem (4) is non-convex and ill posed because only $Z_1$ and $Z_2$ are observed, and K, $E_1$ and $E_2$ are unknowns. To remedy this situation, we invoke the following prior conditions in our problem. Highly complex systems can be accurately modeled by low-order dynamics. This translates to the prior condition that the operator K modeling the evolution of a noise-free system has a low rank.

The second prior condition derives from the definition of the matrices $E_1$ and $E_2$. If we denote by $I_{m-1}$ the identity matrix of size $(m-1)\times(m-1)$, and let $\mathbb{I}^0 = [0|I_{m-1}]^T$ and $\mathbb{I}_0 = [I_{m-1}|0]^T$ be selection operators that respectively remove the first column and the last column of a matrix with m columns, then $E_1$ and $E_2$ satisfy a relation $$E_1 \mathbb{I}^0 = W_2 \mathbb{I}_0. \quad (5)$$

We define the low-rank DMD with total least squares constraints (LR-DMDtls) as $$\min_{K,E_1,E_2} \|K\|_* + \frac{\gamma}{2}(\|E_2\|_F^2 + \|e_0\|_2^2), \quad (6)$$

subject to $Z_2 + E_2 = K(Z_1 + E_1)$, and $$E_1 \mathbb{I}^0 = E_2 \mathbb{I}_0,$$

subject to $Z_2 + E2 = K(Z_1 + E_1)$, and $$E_1 II^0 = E_2 II_0, \quad (6)$$

where $e_0$ is the first column in $E_1$, $\gamma$ is a regularization parameter, and $\|K\|_*$ is the nuclear norm equal to the sum of the singular values of a matrix K.

If the number of motion blocks in a video frame is N, then the size of the operator K is N×N, which can become difficult to store and determine for high resolution videos. Therefore, we replace K with rank r factors $L \in \mathbb{R}^{N\times r}$ and $R \in \mathbb{R}^{N\times r}$, such that $K = LR^T$, to reduce the computational complexity. We use a nuclear norm proxy that replaces the nuclear norm of a matrix with an average of the square of the Frobenius norms of its low rank factors $$\|K\|_* = \inf_{L,R:K=LR^T} \frac{1}{2}(\|L\|_F^2 + \|R\|_F^2). \quad (7)$$

Consequently, the low-rank DIMD can be formulated as $$\min_{L,R,E_1,E_2} \frac{1}{2}(\|L\|_F^2 + \|R\|_F^2) + \frac{\gamma}{2}(\|E_2\|_F^2 + \|e_0\|_2^2), \quad (8)$$

subject to $Z_2 + E_2 = LR^T(Z_1 + E_1)$, and $$E_1 \mathbb{I}^0 = E_2 \mathbb{I}_0,$$

which we solve using an alternating direction method of multiplier (ADMM).

The problem defined in (8) addresses the case where the noise is Gaussian distributed. If the measurements Z include outlier sparse noise, then we use the following formulation to solve the problem $$\min_{L,R,E_1,E_2,S_1,S_2} \frac{1}{2}(\|L\|_F^2 + \|R\|_F^2) + \frac{\gamma}{2}(\|E_2\|_F^2 + \|e_0\|_2^2) + \lambda\|S_2\|_1, \quad (9)$$

subject to $Z_2 + E_2 + S_2 = LR^T(Z_1 + E_1 + S_1),$ $$E_1 \mathbb{I}^0 = E_2 \mathbb{I}_0,$$
$$S_1 \mathbb{I}^0 = S_2 \mathbb{I}_0,$$

where the variables $S_1$ and $S_2$ represent the outlier noise in the data, and $\gamma$ and $\lambda$ are regularization parameters. The solution to (9) can also be obtained using the ADMM procedure.

Flow Segmentation

In order to segment 300 different flows having independent dynamics, we evaluate the spectrum of the estimated low-rank control Koopman operator $K=LR^T$. Here, we consider different scenarios for performing the segmentation.

Segmentation by Singular Value Decomposition

In a first approach, we can perform The SVD 210 of the Koopman opertor K to extract row space singular vectors $U_r$ 211, such that $K=U_r\Sigma_r V_r$. The matrix $U_r$ is an N×r matrix, where r is the rank of the operator K. We treat the rows of $U_r$ as feature vectors for every pixel in the video frame to which we apply k-means clustering 310, as shown in FIG. 3, to segment the pixels into a predetermined number of clusters n. Then, the clustered pixels can be used to determine the spatial segmentation of independent flows 109 in the scene 102 as observed in the video 101.

Alternatively, we can apply spectral clustering to the rows of the matrix $U_r$. Here, we normalize the rows of $U_r$ to produce a matrix $\bar{U}_r$ and construct an affinity matrix $A=|\bar{U}_r \bar{U}_r^T|^2$, where the exponent is applied element-wise in this case. We then apply the following steps to determine the principal eigenvectors of the corresponding graph Laplacian.

$$A = A - \text{diag}(A)$$

$$D = \text{diag}(A \cdot 1)$$

$$L_G = D^{-1/2} A D^{-1/2}, \quad (10)$$

where 1 is the all one vector, the first diag(·) extracts only the diagonal entries of A, and the second diag (A·1) sums the rows of A and places the result on the diagonal of a matrix.

Next, we determine the SVD of $L_G$ to extract the first n row space singular vectors $U_G$. The first singular vector of $U_G$ is all ones so we remove this vector and then normalize the rows of the remaining vectors in $U_G$.

Finally, we apply k-means clustering 310 to the rows of $U_G$ to determine the independent flows 109. While the spectral clustering approach delivers better results than applying k-means clustering directly to the rows of $U_r$, it requires more large to construct a large N×N affinity matrix.

Segmentation by Eigenvalue Decomposition

In a second approach, we determine an eigenvalue decomposition 220 of K to obtain the eigenvectors $U_e$ 221, and eigenvalues $\Lambda_e$, such that $K=U_e\Lambda_e U_e^\dagger$. Recall, the eigenvectors of K estimate the Koopman modes of the dynamical system. From the data matrix $Z_2$, we identify the active modes by projecting $Z_2$ onto $U_e$ and averaging magnitudes of the projection coefficients in a vector $$\alpha = \frac{1}{m}|U_e^\dagger Z_2| \cdot 1.$$

The active modes are the columns of $U_e$ that correspond to the entries in $\alpha$ with a magnitude greater than a threshold.

The matrix containing the active modes is $U_a$. We perform the segmentation by applying k-means clustering to the normalized rows of $U_a$. The pixels identifying with each cluster correspond to an independent flow in the video.

Flow Characterization

Each segmented flow can be characterized acccording to a dynamical regime, such that, the type of the flow is labeled as, for example, stable or unstable. The dynamical regime depends on locations of the eigenvalues of K that contribute most to the motion in that flow. To determine the eigenvalues, a subset of rows $Z_f$ of the data matrix associated with a segmented flow f are projected onto the eigenvectors $U_e$ to determine projection coefficeints $$\alpha_f = \frac{1}{m}|U_e^\dagger Z_f| \cdot 1.$$

The eigenvalues corresponding to the entries in $\alpha_f$, with magnitudes larger than a threshold, are associated with the flow.

The locations of the eigenvalues in the complex plane are used to determine the regime of the flow. For example, stable flows have eigenvalues located on a unit circle, while unstable flows have eigenvalues located outside the unit circle. Moreover, transient flows that gradually decay have eigenvalues located inside the unit circle. Also, the complex phase of the eigenvalues indicate oscillating frequencies of the motion in a flow.

Features

According to another embodiment of the present disclosure, a system for determining states of flow of objects in a scene. The system including at least one sensor to measure the states of the flow at observed sample points of the scene. Wherein the scene contains a set of sample points having subsets of observed and unobserved sample points, and a set of control inputs. A memory to store an operator specifying time-varying dynamics of training states of flow of the objects in the scene. Wherein the operator is pretrained to determine an estimated future state of the states of flow of the objects at a sample point in the scene, as a function of current measured states of the states of flow of the objects at the set of sample points in the scene and the set of control inputs that define initial and boundary states of the flow. A processor in communication with the memory, configured to estimate, using the operator and the measured states at the subset of observed sample points, the states of the flow of the objects at the subset of unobserved sample points of the scene. Such that the estimated future states at the subset of observed sample points are consistent with the measured states at the subset of observed sample points. An output interface in communication with the processor, configured for outputting the states of the flow at the set of unobserved sample points of the scene, so as to assist in a management of managing states of flow of objects in the scene. Wherein one or a combination of the following aspects below are contemplated as configuring a modified embodiment of the above embodiment.

According to an aspect of the present disclosure, the training of the operator can include obtaining historical data of training states and control inputs of the flow of objects in the set of sample points in the scene. Simulating according to a model, the training states of the flow of objects in the set of sample points in the scene. Or, obtaining the training states of the flow of objects in a series of subsets of sample points in the scene. Wherein at least one subset of the sample points in the series of subsets of sample points, are observed sample points at a time that is different than observable sample points times for the remaining subsets of the sample points in the series of subsets of sample points in the scene. Such that all the subsets of the sample points in the series of sample points in the scene include all the sample points in the set of sample points in the scene.

Another aspect of the present disclosure can include the estimating of the states of the flow of the objects at the subset of unobserved sample points of the scene includes determining a set of coefficients for a set of basis matrices by minimizing an error between the set of observed sample points of the scene by the sensors and the estimated future states at the subset of observed sample points of the operator. Confirming that the set of coefficients for the set of basis matrices conform to a temporal prediction condition according to a set of eigenvalues of the operator.

Another aspect of the present disclosure can include the operator is a system dynamics operator, such that the system dynamics operator is a kernel dynamic mode decomposition (KDMD) operator.

A method for determining states of flow of objects in a scene. The method including measuring states of flow at observed sample points of the scene. Wherein the scene contains a set of sample points having subsets of observed and unobserved sample points and a set of control inputs. Storing in a memory an operator specifying time-varying dynamics of training states of flow of the objects in the scene. Wherein the operator is pretrained to determine an estimated future state of the states of flow of the objects at a sample point in the scene, as a function of current measured states of the states of flow of the objects at the set of sample points in the scene and the set of control inputs. Using a processor in communication with the memory, the processor is configured to estimate, using the operator and the measured states at the subset of observed sample points, the states of the flow of the objects at the subset of unobserved sample points of the scene. Such that the estimated future states at the subset of observed sample points are consistent with the measured states at the subset of observed sample points. Outputting the states of the flow at the set of unobserved sample points of the scene, so as to assist in a management of managing states of flow of objects in the scene, via an output interface in communication with the processor. Wherein one or a combination of the following aspects below are contemplated as configuring a modified embodiment of the above embodiment.

According to an aspect of the present disclosure, the training of the operator includes obtaining historical data of training states of the flow of objects in the set of sample points in the scene. Simulating according to a model, the training states of the flow of objects in the set of sample points in the scene. Or, obtaining the training states of the flow of objects in a series of subsets of sample points in the scene. Wherein at least one subset of the sample points in the series of subsets of sample points, are observed sample points at a time that is different than observable sample points times for the remaining subsets of the sample points in the series of subsets of sample points in the scene. Such that all the subsets of the sample points in the series of sample points in the scene include all the sample points in the set of sample points in the scene.

Another aspect of the present disclosure can include the estimating of the states of the flow of the objects at the subset of unobserved sample points of the scene includes determining a set of coefficients for a set of basis matrices by minimizing an error between the set of observed sample points of the scene by the sensors and the estimated future states at the subset of observed sample points of the operator. Confirming that the set of coefficients for the set of basis matrices conform to a temporal prediction condition according to a set of eigenvalues of the operator.

Another aspect of the present disclosure can include the measuring the states of flow at observed sample points of the scene are with at least one sensor positioned approximate the scene.

Another aspect of the present disclosure can include the operator is a system dynamics operator, such that the system dynamics operator is a kernel dynamic mode decomposition (KDMD) operator.

A non-transitory computer readable storage medium embodied thereon a program executable by a processor for performing a method, the method for determining states of flow of objects in a scene. The non-transitory computer readable storage medium including measuring states of flow at observed sample points of the scene, wherein the scene contains a set of sample points having subsets of observed and unobserved sample points and a set of control inputs. Storing in a memory an operator specifying time-varying dynamics of training states of flow of the objects in the scene. Wherein the operator is pretrained to determine an estimated future state of the states of flow of the objects at a sample point in the scene, as a function of current measured states of the states of flow of the objects at the set of sample points in the scene and the set of control inputs. Using a processor in communication with the memory, the processor is configured to estimate, using the operator and the measured states at the subset of observed sample points, the states of the flow of the objects at the subset of unobserved sample points of the scene. Such that the estimated future states at the subset of observed sample points are consistent with the measured states at the subset of observed sample points. Outputting the states of the flow at the set of unobserved sample points of the scene, so as to assist in a management of managing states of flow of objects in the scene, via an output interface in communication with the processor. Wherein one or a combination of the following aspects below are contemplated as configuring a modified embodiment of the above embodiment.

According to an aspect of the present disclosure, the training of the operator includes obtaining historical data of training states of the flow of objects in the set of sample points in the scene. Simulating according to a model, the training states of the flow of objects in the set of sample points in the scene. Or, obtaining the training states of the flow of objects in a series of subsets of sample points in the scene, wherein at least one subset of the sample points in the series of subsets of sample points, are observed sample points at a time that is different than observable sample points times for the remaining subsets of the sample points in the series of subsets of sample points in the scene. Such that all the subsets of the sample points in the series of sample points in the scene include all the sample points in the set of sample points in the scene.

Another aspect of the present disclosure can include the operator is a kernel dynamic mode decomposition (KDMD) operator. Such that the non-transitory computer readable storage medium is a data-driven framework for flow completion. Wherein training data obtain from the memory that is defined over a complete scene $\Omega$ are available to learn the KDMD operator that captures the dynamics of flows in the scene.

Another aspect of the present disclosure can include the estimating of the states of the flow of the objects at the subset of unobserved sample points of the scene includes determining a set of coefficients for a set of basis matrices by minimizing an error between the set of observed sample points of the scene by the sensors and the estimated future states at the subset of observed sample points of the operator. Confirming that the set of coefficients for the set of basis matrices conform to a temporal prediction condition according to a set of eigenvalues of the operator.

Another aspect of the present disclosure can include the measuring the states of flow at observed sample points of the scene are with at least one sensor positioned approximate the scene.

Another aspect of the present disclosure can include, the operator is a system dynamics operator, such that the system dynamics operator is a kernel dynamic mode decomposition (KDMD) operator.

Definitions

According to aspects of the present disclosure, and based on learnings from experimentation, the following definitions have been established, and certainly are not a complete definition of each phrase or term. Wherein the provided definitions are merely provided as an example, based upon realizations and further understanding of concepts from experimentation, wherein other interpretations, definitions, and other aspects may pertain. However, for at least a mere basic preview of the concept, phrase or term presented, such definitions have been provided.

Processor, by non-limiting example, as stated in claim 1 can be computer hardware, i.e. a logic circuitry that responds to and processes the basic instructions that drive a computer to implement the algorithm described in present disclosure.

Macroscopic Model for Pedestrian Flows: The macroscopic model for crowd flow considers the crowd as a flowing continuum and describes the average behavior of pedestrians. The model parameters are the density of the crowd p, and the horizontal and vertical velocities (u,v) at each point in the grid if. Macroscopic models for crowd flow are similar to models of fluid dynamics and are governed by the following hypotheses:

H1. The speed of pedestrians at each point is determined only by the density of the crowd around that point.

H2. Pedestrians have a common goal (potential).

H3. Pedestrians want to minimize the estimated travel time, simultaneously avoiding the large density areas. These hypotheses can be translated into the following PDE $$\begin{cases} \partial_t \rho + \partial_x (\rho u) + \partial_y (\rho v) = 0 \\ \rho \partial_t u + \rho(u\partial_x u + v\partial_y u) + K^2 \partial_x \rho v_{x_0} = \rho A_1[\rho, \vec{v}], \\ \rho \partial_t v + \rho(u\partial_x v + v\partial_y v) + K^2 \partial_y \rho v_{y_0} = \rho A_2[\rho, \vec{v}], \end{cases} \quad (1)$$

where ρ(x,y) is the density, u(x,y) is the horizontal velocity, v(x,y) are respectively the horizontal and vertical velocities at all point (x,y) ∈Ω, and $$A_1[\rho,\sim v]=\alpha u\hat{}(\rho)(x_0-x),$$

$$A_2[\rho,\sim v]=\alpha v\hat{}(\rho)(y_0-y)$$

encode the goal of the pedestrians with $(x_0, y_0)$ being the target position and (x,y) the current positions. α and K are model parameters. The functions $\hat{u}(\rho)=u_o(1-\rho/\rho_o)$ and $\hat{v}(\rho)=v_o(1-\rho/\rho_o)$ obey the Greenshield's model which couples the magnitude of the velocity to the density. This allows to drive the dynamical system using either the velocity or the density alone.

Koopman and dynamic mode decomposition:

The Koopman Operator

Let (M,n,F) be a discrete time dynamical system, where $M \subseteq \mathbb{R}^N$ is the state space, n∈Z is the time parameter and F: M→M is the system evolution operator. The Koopman operator K is defined on the space of functions F, where F={φ|φ:M→ℂ}:, as follows:

$$K\phi=\phi\circ F \quad (2)$$

The Koopman operator is linear and infinite dimensional, and it admits eigenvalues and eigenfunctions. For vector valued observables $g: M \to \mathbb{R}^{N}_o$:, the Koopman operator also admits Koopman modes. The Koopman operator specifies a new discrete time dynamical system on the function space (F,n,K). Let φk(x), 1≤k≤K be the top K eigenfunctions of K. Without loss of generality, let the system variable be x∈M and assume that the function g(x)=x. Then, shows that $$g(x) = x = \sum_{k=1}^{K} \xi_k \varphi_k(x)$$

and the future state F(x) can be estimated as $$F(x) = (Kg)(x) = \sum_{k=1}^{K} \xi_k (K\varphi_k)(x) = \sum_{k=1}^{K} \lambda_k \xi_k \varphi_k(x). \quad (3)$$

where $\xi_k$ and $\lambda_k$ are the Koopman modes and Koopman eigenvalues.

Kernel Dynamic Mode Decomposition

A Kernel DMD (KDMD) algorithm is viewed as a low complexity method for approximating the Koopman operator. Let f: M×M→R be a kernel function, and define the following data matrices $$\hat{G}_{ij}=f(x_i,x_j), \hat{A}_{ij}=f(y_i,x_j) \quad (4)$$

where $x_i$ and $y_j$ are column vectors of the data sets X and Y. A rank-r truncated singular value decomposition of the symmetric matrix Ĝ, results in the singular vector matrix Q and the singular value matrix $\Sigma^2$. The KDMD operator K' is then computed using $$\hat{K}=(\Sigma^{\dagger}Q^T)\hat{A})Q\Sigma^{\dagger}) \quad 5)$$

An eigenvalue decomposition of K̂ results in the eigenvector matrix V̂ and eigenvalue matrix Λ. It was shown in that Λ approximates the Koopman eigenvalues. Moreover, the Koopman eigenfunctions are approximated by the matrix $\Phi=V^T\Sigma^T Q^T$. Since every data point $x_i=\Sigma_k \lambda_k \xi_k \phi_k$, the Koopman modes are approximated by the matrix $\mu=X\Phi^{\dagger}=Q\Sigma^{\dagger}\hat{V}^{\dagger}$, where $X=[x_1 \ldots x_T]$.

For every new data point x*, the corresponding prediction y*≈F(x*) can be approximated using KDMD by first estimating the eigenfunction $$\varphi(x^*)=\Phi[f(x^*,x_1),f(x^*,x_2),\ldots,f(x^*,x_T)]^T \quad (6)$$

and using the Koopman prediction relation $$\begin{cases} x^* \approx \Xi\varphi(x^*), \\ y^* \approx \Xi\Lambda\varphi(x^*) \end{cases}. \quad (7)$$

Figure 7:
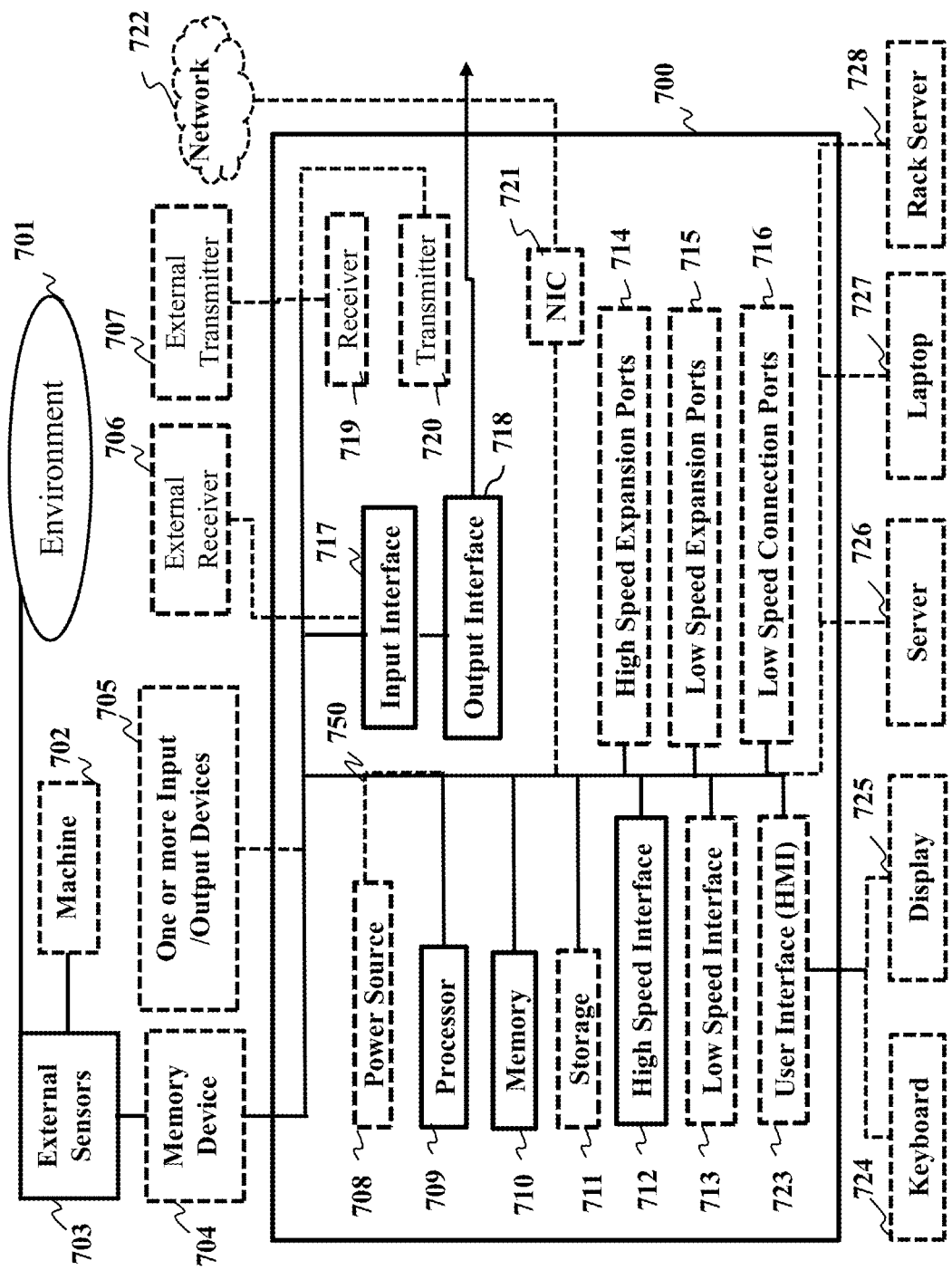
FIG. 7 is a schematic illustrating a computing apparatus that can be used to implement some techniques of the methods and systems, according to embodiments of the present disclosure.

FIG. 7 is a schematic illustrating by non-limiting example a computing apparatus 700 that can be used to implement some techniques of the methods and systems, according to embodiments of the present disclosure. The computing apparatus or device 700 represents various forms of digital computers, such as laptops, desktops, workstations, personal digital assistants, servers, blade servers, mainframes, and other appropriate computers.

The computing device 700 can include a power source 708, a processor 709, a memory 710, a storage device 711, all connected to a bus 750. Further, a high-speed interface 712, a low-speed interface 713, high-speed expansion ports 714 and low speed connection ports 715, can be connected to the bus 750. Also, a low-speed expansion port 716 is in connection with the bus 750. Contemplated are various component configurations that may be mounted on a common motherboard, by non-limiting example, 730, depending upon the specific application. Further still, an input interface 717 can be connected via bus 750 to an external receiver 706 and an output interface 718. A receiver 719 can be connected to an external transmitter 707 and a transmitter 720 via the bus 750. Also connected to the bus 750 can be an external memory 704, external sensors 703, machine(s) 702 and an environment 701. Further, one or more external input/output devices 705 can be connected to the bus 750. A network interface controller (NIC) 721 can be adapted to connect through the bus 750 to a network 722, wherein data or other data, among other things, can be rendered on a third party display device, third party imaging device, and/or third party printing device outside of the computer device 700.

Contemplated is that the memory 710 can store instructions that are executable by the computer device 700, historical data, and any data that can be utilized by the methods and systems of the present disclosure. The memory 710 can include random access memory (RAM), read only memory (ROM), flash memory, or any other suitable memory systems. The memory 710 can be a volatile memory unit or units, and/or a non-volatile memory unit or units. The memory 710 may also be another form of computer-readable medium, such as a magnetic or optical disk.

Still referring to FIG. 7, a storage device 711 can be adapted to store supplementary data and/or software modules used by the computer device 700. For example, the storage device 711 can store historical data and other related data as mentioned above regarding the present disclosure. Additionally, or alternatively, the storage device 711 can store historical data similar to data as mentioned above regarding the present disclosure. The storage device 711 can include a hard drive, an optical drive, a thumb-drive, an array of drives, or any combinations thereof. Further, the storage device 711 can contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 709), perform one or more methods, such as those described above.

The system can be linked through the bus 750 optionally to a display interface or user Interface (HMI) 723 adapted to connect the system to a display device 725 and keyboard 724, wherein the display device 725 can include a computer monitor, camera, television, projector, or mobile device, among others.

Still referring to FIG. 7, the computer device 700 can include a user input interface 717 adapted to a printer interface (not shown) can also be connected through bus 750 and adapted to connect to a printing device (not shown), wherein the printing device can include a liquid inkjet printer, solid ink printer, large-scale commercial printer, thermal printer, UV printer, or dye-sublimation printer, among others.

The high-speed interface 712 manages bandwidth-intensive operations for the computing device 700, while the low-speed interface 713 manages lower bandwidth-intensive operations. Such allocation of functions is an example only. In some implementations, the high-speed interface 712 can be coupled to the memory 710, a user interface (HMI) 723, and to a keyboard 724 and display 725 (e.g., through a graphics processor or accelerator), and to the high-speed expansion ports 714, which may accept various expansion cards (not shown) via bus 750. In the implementation, the low-speed interface 713 is coupled to the storage device 711 and the low-speed expansion port 715, via bus 750. The low-speed expansion port 715, which may include various communication ports (e.g., USB, Bluetooth, Ethernet, wireless Ethernet) may be coupled to one or more input/output devices 705, and other devices a keyboard 724, a pointing device (not shown), a scanner (not shown), or a networking device such as a switch or router, e.g., through a network adapter.

Still referring to FIG. 7, the computing device 700 may be implemented in a number of different forms, as shown in the figure. For example, it may be implemented as a standard server 726, or multiple times in a group of such servers. In addition, it may be implemented in a personal computer such as a laptop computer 727. It may also be implemented as part of a rack server system 728. Alternatively, components from the computing device 700 may be combined with other components in a mobile device (not shown). Each of such devices may contain one or more of the computing device and the mobile computing device, and an entire system may be made up of multiple computing devices communicating with each other.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system for determining states of flow of objects in a scene, comprising:
    at least one sensor to measure the states of the flow at observed sample points of the scene, wherein the scene contains a set of sample points having subsets of observed and unobserved sample points, and a set of control inputs;
    a memory to store an operator specifying time-varying dynamics of training states of flow of the objects in the scene, wherein the operator is pretrained to determine an estimated future state of the states of flow of the objects at a sample point in the scene, as a function of current measured states of the states of flow of the objects at the set of sample points in the scene and the set of control inputs that define initial and boundary states of the flow;
    a processor in communication with the memory, configured to estimate, using the operator and the measured states at the subset of observed sample points, the states of the flow of the objects at the subset of unobserved sample points of the scene, such that the estimated future states at the subset of observed sample points are consistent with the measured states at the subset of observed sample points; and
    an output interface in communication with the processor, configured for outputting the states of the flow at the set of unobserved sample points of the scene, so as to assist in a management of managing states of flow of objects in the scene.

2. The system of claim 1, wherein the training of the operator includes:
    obtaining historical data of training states and control inputs of the flow of objects in the set of sample points in the scene;
    simulating according to a model, the training states of the flow of objects in the set of sample points in the scene; or
    obtaining the training states of the flow of objects in a series of subsets of sample points in the scene, wherein at least one subset of the sample points in the series of subsets of sample points, are observed sample points at a time that is different than observable sample points times for the remaining subsets of the sample points in the series of subsets of sample points in the scene, such that all the subsets of the sample points in the series of sample points in the scene include all the sample points in the set of sample points in the scene.

3. The system of claim 1, wherein the estimating of the states of the flow of the objects at the subset of unobserved sample points of the scene includes:
determining a set of coefficients for a set of basis matrices by minimizing an error between the set of observed sample points of the scene by the sensors and the estimated future states at the subset of observed sample points of the operator; and
confirming that the set of coefficients for the set of basis matrices conform to a temporal prediction condition according to a set of eigenvalues of the operator.

4. The system of claim 1, wherein the operator is a system dynamics operator, such that the system dynamics operator is a kernel dynamic mode decomposition (KDMD) operator.

5. A method for determining states of flow of objects in a scene, comprising:
measuring states of flow at observed sample points of the scene, wherein the scene contains a set of sample points having subsets of observed and unobserved sample points and a set of control inputs;
storing in a memory an operator specifying time-varying dynamics of training states of flow of the objects in the scene, wherein the operator is pretrained to determine an estimated future state of the states of flow of the objects at a sample point in the scene, as a function of current measured states of the states of flow of the objects at the set of sample points in the scene and the set of control inputs;
using a processor in communication with the memory, the processor is configured to estimate, using the operator and the measured states at the subset of observed sample points, the states of the flow of the objects at the subset of unobserved sample points of the scene, such that the estimated future states at the subset of observed sample points are consistent with the measured states at the subset of observed sample points; and
outputting the states of the flow at the set of unobserved sample points of the scene, so as to assist in a management of managing states of flow of objects in the scene, via an output interface in communication with the processor.

6. The method of claim 5, wherein the training of the operator includes:
obtaining historical data of training states of the flow of objects in the set of sample points in the scene;
simulating according to a model, the training states of the flow of objects in the set of sample points in the scene; or
obtaining the training states of the flow of objects in a series of subsets of sample points in the scene, wherein at least one subset of the sample points in the series of subsets of sample points, are observed sample points at a time that is different than observable sample points times for the remaining subsets of the sample points in the series of subsets of sample points in the scene, such that all the subsets of the sample points in the series of sample points in the scene include all the sample points in the set of sample points in the scene.

7. The method of claim 5, wherein the estimating of the states of the flow of the objects at the subset of unobserved sample points of the scene includes:
determining a set of coefficients for a set of basis matrices by minimizing an error between the set of observed sample points of the scene by the sensors and the estimated future states at the subset of observed sample points of the operator; and
confirming that the set of coefficients for the set of basis matrices conform to a temporal prediction condition according to a set of eigenvalues of the operator.

8. The method of claim 5, wherein the measuring the states of flow at observed sample points of the scene are with at least one sensor positioned approximate the scene.

9. The method of claim 5, wherein the operator is a system dynamics operator, such that the system dynamics operator is a kernel dynamic mode decomposition (KDMD) operator.

10. A non-transitory computer readable storage medium embodied thereon a program executable by a processor for performing a method, the method for determining states of flow of objects in a scene, comprising:
measuring states of flow at observed sample points of the scene, wherein the scene contains a set of sample points having subsets of observed and unobserved sample points and a set of control inputs;
storing in a memory an operator specifying time-varying dynamics of training states of flow of the objects in the scene, wherein the operator is pretrained to determine an estimated future state of the states of flow of the objects at a sample point in the scene, as a function of current measured states of the states of flow of the objects at the set of sample points in the scene and the set of control inputs;
using a processor in communication with the memory, the processor is configured to estimate, using the operator and the measured states at the subset of observed sample points, the states of the flow of the objects at the subset of unobserved sample points of the scene, such that the estimated future states at the subset of observed sample points are consistent with the measured states at the subset of observed sample points; and
outputting the states of the flow at the set of unobserved sample points of the scene, so as to assist in a management of managing states of flow of objects in the scene, via an output interface in communication with the processor.

11. The non-transitory computer readable storage medium according to claim 10, wherein the training of the operator includes:
obtaining historical data of training states of the flow of objects in the set of sample points in the scene;
simulating according to a model, the training states of the flow of objects in the set of sample points in the scene; or
obtaining the training states of the flow of objects in a series of subsets of sample points in the scene, wherein at least one subset of the sample points in the series of subsets of sample points, are observed sample points at a time that is different than observable sample points times for the remaining subsets of the sample points in the series of subsets of sample points in the scene, such that all the subsets of the sample points in the series of sample points in the scene include all the sample points in the set of sample points in the scene.

12. The non-transitory computer readable storage medium according to claim 10, wherein the operator is a kernel dynamic mode decomposition (KDMD) operator, such that the non-transitory computer readable storage medium is a data-driven framework for flow completion, wherein training data obtain from the memory that is defined over a complete scene $\Omega$ are available to learn the KDMD operator that captures the dynamics of flows in the scene.

13. The non-transitory computer readable storage medium according to claim 10, wherein the estimating of the states of the flow of the objects at the subset of unobserved sample points of the scene includes:
   determining a set of coefficients for a set of basis matrices by minimizing an error between the set of observed sample points of the scene by the sensors and the estimated future states at the subset of observed sample points of the operator; and
   confirming that the set of coefficients for the set of basis matrices conform to a temporal prediction condition according to a set of eigenvalues of the operator.

14. The non-transitory computer readable storage medium according to claim 10, wherein the measuring the states of flow at observed sample points of the scene are with at least one sensor positioned approximate the scene.

15. The non-transitory computer readable storage medium according to claim 10, wherein, the operator is a system dynamics operator, such that the system dynamics operator is a kernel dynamic mode decomposition (KDMD) operator.

\* \* \* \* \*